United States Patent [19]

Lorenc et al.

[11] 4,011,171

[45] Mar. 8, 1977

[54] BOILER TREATMENT USING AMINES AND ORGANOPHOSPHONATE MATERIALS

[75] Inventors: Walter F. Lorenc, Harvey; Dean H. Joneson, Oak Lawn, both of Ill.

[73] Assignee: Nalco Chemical Company, Oak Brook, Ill.

[22] Filed: Jan. 29, 1976

[21] Appl. No.: 653,681

[52] U.S. Cl. ............................ 252/180; 210/58; 252/175; 252/548

[51] Int. Cl.$^2$ .............................. C02B 5/06

[58] Field of Search ............ 252/175, 548, 180; 210/58

[56] References Cited

UNITED STATES PATENTS

| | | | |
|---|---|---|---|
| 2,915,444 | 12/1959 | Meyer | 252/548 |
| 3,666,664 | 5/1972 | Lorenc et al. | 252/180 |
| 3,671,448 | 5/1972 | Kowalski | 252/175 |
| 3,804,770 | 4/1974 | Lorenc et al. | 252/180 |

*Primary Examiner*—Mayer Weinblatt
*Attorney, Agent, or Firm*—John G. Premo; Robert A. Miller; Barry W. Sufrin

[57] ABSTRACT

A method of inhibiting the precipitation of scale deposits in water systems using a scale preventive composition which consists of a combination of an organophosphonate material and an amine selected from the group consisting of dihydroxyethylethylenediamine, trihydroxyethylethylenediamine, tetrahydroxyethylethylenediamine, and aminoethylethanolamine and combinations thereof. The combination of the organophosphonate material and the amine provides a synergistic effect in the prevention of scale deposits in water systems.

2 Claims, No Drawings

BOILER TREATMENT USING AMINES AND ORGANOPHOSPHONATE MATERIALS

INTRODUCTION

Commercial water systems, such as, for example, boiler water systems, contain alkali earth metal cations such as calcium, barium, magnesium, etc., and several anions such as bicarbonate, carbonate, sulfate, oxylate, phosphate, silicate, fluoride, etc. As described in U.S. Pat. Nos. 3,666,664 and 3,804,770, when combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form. Solubility product concentrations are exceeded for various reasons, such as evaporation of the water phase, change in pH, pressure or temperature, and the introduction of additional ions already present in the solution.

The precipitation of these solid precipitates results in the formation of scale on the surfaces of the water system, such as in the tubes of a boiler. This will result in lower heat transfer efficiency and fluid flow rate and facilitates corrosive processes and harbors bacteria.

U.S. Pat. Nos. 3,666,664 and 3,804,770 disclose the use of certain organophosphonates in combination with nitrilotriacetic acid and ethylenediaminetetraacetic acid to provide compositions for scale prevention.

Amines such as, for example, dihydroxyethylethylenediamine, trihydroxyethylethylenediamine, tetrahydroxyethylethylenediamine and aminoethylethanolamine have been found to be inactive as scale preventive compositions. However, this invention discloses the synergistic effect that is obtained by utilizing certain organophosphonates in combination with the aforementioned amines.

These combinations provide an advantage in that the quantity of scale prevention composition can be reduced.

OBJECTS

It is an object of this invention to provide improved scale prevention compositions.

It is another object of this invention to provide improved scale prevention compositions consisting of certain organophosphonates and certain amines.

It is a further object of this invention to provide a method of inhibiting the precipitation of scale deposits in a water system, particularly boiler water systems.

It is a still further object of this invention to provide a method of inhibiting the precipitation of scale deposits in a water system utilizing a scale prevention composition consisting of certain organophosphonates and certain amines.

THE INVENTION

This invention comprises a composition containing a synergistic blend of a specific organophosphonate and an amine selected from the group consisting of dihydroxyethylethylenediamine, trihydroxyethylethylenediamine, tetrahydroxyethylethylenediamine, and aminoethylethanolamine and combinations thereof. The specific organophosphonate material of this invention has the formula:

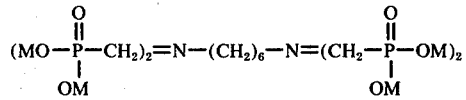

where M is selected from the group consisting of H, $NH_4$, alkali metal, or combinations thereof. Preferably, M is potassium, which can easily be made by adding potassium hydroxide to the organophosphonate. The organophosphonate can be easily prepared from the reaction of hexamethylene diamine, formaldehyde, and phosphorous acid. This organophosphonate material is effective alone for preventing the scale deposits in a water system, but unusual and unexpected results are obtained using the synergistic combinations of this invention.

Generally the ratio of amine to organophosphonate ranges from 20:1 to 1:20. Preferably the ratio is 1:1 to 10:1. This invention also discloses a method of inhibiting the precipitation of scale deposits in a water system by adding the synergistic combination to the water system. The synergistic combination is added based on the hardness of the water. Generally, the combination is added in a ratio to hardness of from 5:1 to 1:100. Preferably, the ratio is from 1.5:1 to 1:10. This method for preventing scale deposits is especially useful when the water contains at least one of barium sulfate, calcium sulfate, calcium carbonate, calcium silicate, magnesium carbonate, and magnesium sulfate. In order to test this synergistic combination the following tests and test equipment were used.

TESTING PROCEDURE

The test equipment consisted of an inclined tube experimental boiler with natural thermal circulation. Volume at normal operating level was 0.56 gallon. The water level itself was automatically contained by 3 insulated electrodes which made contact with the boiler water to operate relays which controlled the feed water pump and heating element. Pressure control was by manual adjustment of a needle valve in the condensed steam line. Boiler test specimens were low carbon steel tubes, 1½ inches O.D. × 10 inches long, closed at one end and flanged at the other. The tubes were bolted in the boiler at an angle of 30° from the horizontal with the closed end down. Heat was applied to the inside and water surrounded the outside. A soft corrugated copper gasket was used to seal the tube in the boiler. The test surface itself was cleaned and polished with No. 3/0 emery paper before each test. Tests were run in absence of chemical (blank) and in a comparative manner with varying dosages of test chemicals. Percent scale prevention was then calculated by measuring deposition of scale upon the test specimen with the benefit of chemical boiler additive, while using the blank run as a basis of comparison and a base of 0 percent reduction. Naturally, a blank run being without chemical additive gives no scale reduction.

The tests were run at ten concentrations, meaning that 10 volumes of water were boiled to give one volume for the test. Tests could have been conducted at 2, 50, 100 or any other concentration.

The feed water contained 6.4 ppm total hardness. The tests were conducted at 900 p.s.i. The following results were obtained using the components and dosages as shown in Table I.

TABLE I

| | Chemical Component | Ratio Amine/phos. | ppm* Total Dosage | Percent Scale Prevention |
|---|---|---|---|---|
| 1. | Blank | | | 0 |
| 2. | Organophosphonate | | 0.1 | 25 |
| 3. | Organophosphonate | | 1.0 | 65 |
| 4. | Organophosphonate | | 5.0 | 65 |
| 5. | D.E.E.D. | | 9.6 | 0 |
| 6. | D.E.E.D./Organophosphonate | 10/1 | 6.4 | 70 |
| 7. | D.E.E.D./Organophosphonate | 8/1 | 6.4 | 85 |
| 8. | Blank | | | 0 |
| 9. | T.E.E.D. | | 9.6 | 0 |
| 10. | T.E.E.D./Organophosphonate | 10/1 | 9.6 | 75 |
| 11. | T.E.E.D./Organophosphonate | 0.5/1 | 9.6 | 70 |
| 12. | Blank | | | 0 |
| 13. | A.E.E.A. | | 9.6 | 0 |
| 14. | A.E.E.A./Organophosphonate | 10/1 | 9.6 | 65 |
| 15. | A.E.E.A./Organophosphonate | 2.5/1 | 9.6 | 80 |
| 16. | Blank | | | 0 |
| 17. | Formulation 1 | | 9.6 | 0 |
| 18. | Formulation 1/Organophosphonate | 10/1 | 9.6 | 75 |

D.E.E.D. - dihydroxyethylethylenediamine
T.E.E.D. - tetrahydroxyethylethylenediamine
A.E.E.A. - aminoethylethanolamine
Formulation 1 contains 77% dihydroxyethylethylenediamine, 15% trihydroxyethylethylenediamine, 3% tetrahydroxyethylethylenediamine, and 5% aminoethylethanolamine.
Organophosphonate has the formula:

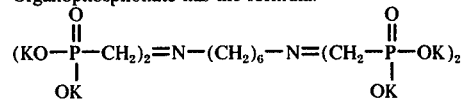

From the data presented above, the scale prevention of the amines by themselves is zero. The combination of the ingredients together shows the synergistic effect. All of the amines tested by themselves gave 0% scale prevention. And yet, when added to the organophosphonate, the results were much better than the results of organophosphonate by itself. The synergistic blend achieves unusual and unexpected results and is more than a mere addition of two known scale preventive additives.

Therefore, what is claimed and desired to be protected by Letters Patent is:

1. A method of inhibiting the precipitation of scale deposits in a water system comprising adding to said system a scale preventive composition consisting essentially of a combination of:

A. An oganophosphonate material having the formula:

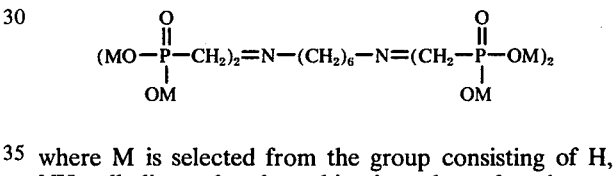

where M is selected from the group consisting of H, $NH_4$, alkali metal and combinations thereof; and B. An amine selected from the group consisting of dihydroxyethylethylenediamine, trihydroxyethylethylenediamine, tetrahydroxyethylethylenediamine and aminoethylethanolamine and combinations thereof; in which the scale preventive composition is added to the system in a range of from 5:1 to 1:100, based on the hardness of said system.

2. The method of claim 1 wherein the scale preventive composition is added to the system in a range of from 1.5:1 to 1:10 based on the hardness of the system.

* * * * *